July 3, 1928.

H. S. GRAVES 1,675,603

PISTON RING CLAMPING DEVICE

Filed Sept. 16, 1926

Inventor

Harry S. Graves

By

Attorneys

Patented July 3, 1928.

1,675,603

UNITED STATES PATENT OFFICE.

HARRY S. GRAVES, OF DETROIT, MICHIGAN.

PISTON-RING CLAMPING DEVICE.

Application filed September 16, 1926. Serial No. 135,808.

This invention relates to a piston ring clamping device that may be termed an assembly tool or a tool for compressing piston rings. Such a tool or device is used for holding a multiplicity of piston rings, side by side, so that the peripheries or outer walls of the rings may be machined or otherwise treated.

In the production of cast piston rings there are inequalities so that it becomes necessary to turn down the rings to a desired diameter. Irrespective of what the inequalities may be in connection with the peripheries or outer walls of the rings, my clamping device permits of the rings being assembled about a holder, compressed or contracted about the holder to snugly engage the same, and then held in such condition so that the holder may be placed in a lathe or other machine employed for turning down the outer walls of the rings to thereby establish a uniform exterior diameter for all the rings on the holder. In order that the compressing or contracting operation may be expeditiously and economically performed it is essential that a yieldable means be employed to engage the outer walls of the rings because the cast or embryo rings, before being machined, are of different thicknesses. This is the main inequality between cast rings and it becomes necessary to employ a yieldable compressing means to compensate for such inequalities when mounting the rings for a lathe operation.

My tool or device is particularly characterized by a holder for the rings and yieldable compressing means for placing the rings snugly on the holder, so that endwise pressure may be brought to bear to sidewise clamp the rings in position.

Figure 1:
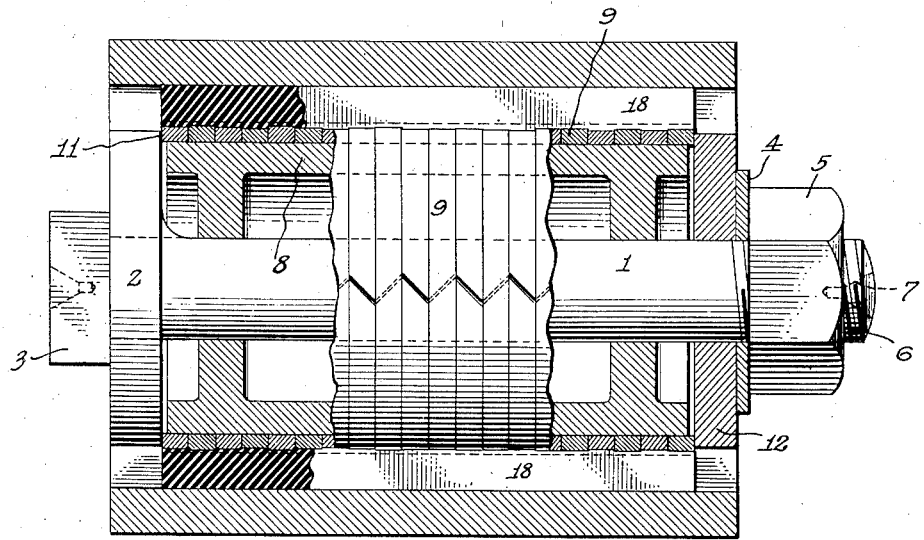
Figure 2:
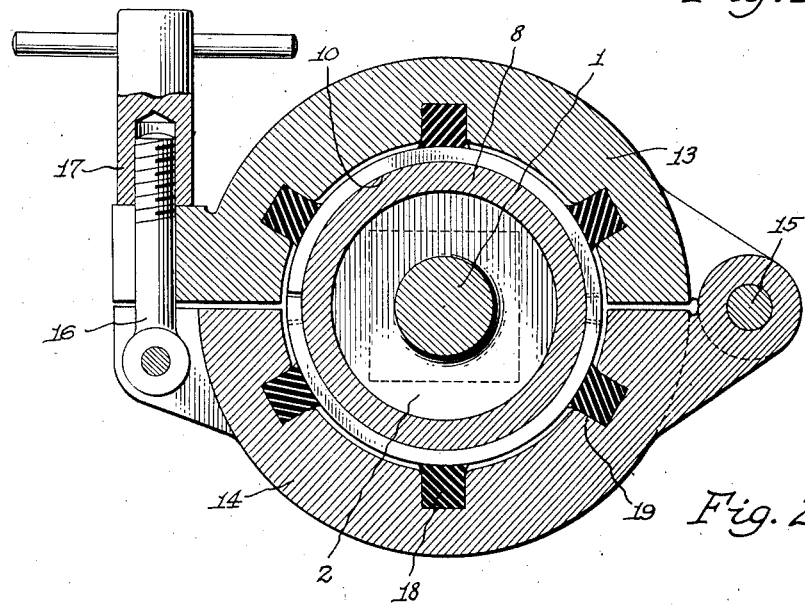

The above and other features of my invention will hereinafter appear and reference will now be had to the drawing, wherein Figure 1 is a longitudinal sectional view of the ring clamping device, and Fig. 2 is a cross sectional view of the same.

In the drawing, the reference numeral 1 denotes an arbor that may be in the form of a bolt having a large cylindrical head 2 and a small centering head 3, or the large head 2 may be detachable relative to the arbor. A lock washer 4 and a nut 5 are adapted to be placed on the threaded end 6 of the arbor or bolts and this end of the arbor or bolt has the usual centering recess 7 similar to the recess 8 of the head 3.

Detachably mounted on the arbor 1 is a cylindrical holder 8 on which may be assembled a multiplicity of split piston rings 9, said rings being arranged side by side and adapted to have the inner walls 10 snugly engage the smooth uniform diameter outer wall of the holder 8. The head 2 of the arbor 1 is of greater diameter than the holder 8 so as to form an annular abutment 11 at one end of the holder for one of the end piston rings. A detachable head or abutment 12, corresponding in diameter to the head 2 is adapted to form an end abutment at the opposite end of the holder 8. It is therefore possible to adjust the nut 5 so as to cause the heads 2 and 12 to exert a pressure against the endmost rings to sidewise clamp these rings assembled about the holder 8.

For the purpose of causing the rings 9 to snugly fit the holder 8 a two-part cylindrical casing is employed composed of semi-cylindrical fans or members 13 and 14 hingedly or otherwise pivotally connected together, as at 15 so that the semi-cylindrical members may be opened and closed relative to the holder and the rings thereon. The casing member 14 has a pivoted eye bolt 16 swingable into engagement with the casing part 13 and adapted to be held by a nut 17. This nut permits of pressure being brought to bear by the casing parts to cause the piston rings to forcibly engage the holder 8.

As pointed out in the beginning, the rings 9 may vary in thickness or have such inequalities that would render it difficult to individually clamp the rings about the holder. Therefore the casing members 13 and 14 are provided with yieldable ring engaging members or cushions 18, which are preferably in the form of bars or strips of rubber or other yieldable material mounted in longitudinal grooves or ways 19 provided therefor in the inner walls of the casing members 13 and 14. These grooves or ways are equally spaced about the inner walls of the casing members and disposed longitudinally thereof with the depth of each groove less than the thickness of a member 18 so that a portion of the member will protrude from the groove and withstand compression when placed in engagement with the outer walls of the rings 9. This is best shown in Fig. 2 where a plurality of these members afford ample means of bracing the rings on the holder 8. These resilient members can yield, as best shown in Fig. 1 because of any inequalities in the external diameters of the piston rings. Obviously the ring engaging members 18, when made of rubber, will be subjected to wear and for this reason the grooves 19 and the members 18 are rectangular in cross section so that the members 18 may be repositioned from time to time to expose the side walls of each member to wear by engaging the rings. This is a distinct advantage compared to a sleeve lining for the casing members 13 and 14, and I find that a multi-point engagement of the rings produces better results than an inner peripheral engagement of the ring.

In practice the piston rings are assembled on the holder with the heads 2 and 12 simply holding the rings side by side without any perceptible clamping action. The holder and its rings are then placed in the cylindrical casing and the casing members clamped together to bring sufficient pressure to bear on the rings to cause the same to firmly clamp the holder 8. While held in this condition pressure is brought to bear on the heads 2 and 12 to sidewise clamp the rings on the holder 8 and prevent any expansion or radial movement of the rings. With the rings so held the casing may be removed, the arbor 1 placed between the head and tail stocks of a lathe and the outer walls of the rings turned down to a desired diameter. It is by virtue of the holder 8 that the inner and outer diameter of all of the rings become uniform after the outer walls are machined, and the holder may be made of such size that the split ends of each ring may be brought into proximity to each other so that the split ends will not interfere with any turning down operation.

One embodiment of my invention has been illustrated, but it is to be understood that the structural elements are susceptible to such variations and modifications as fall within the scope of the appended claims.

What I claim is:—

1. In a tool for exerting closing pressure upon piston rings, a holder for the piston rings, a casing adapted to be placed about the piston rings on the holder to exert pressure on the piston rings, invertible strips of yieldable material in said casing adapted to bear on the piston rings of said holder, and means at the ends of said holder adapted for clamping the piston rings on said holder.

2. A tool as called for in claim 1, wherein said strips of material are longitudinally disposed in said casing and equally spaced in the inner wall of said casing.

3. A tool as called for in claim 1, wherein said casing is longitudinally grooved to receive said strips, and said strips and grooves of a cross sectional shape which permits of said strips being shifted to present various ring engaging faces.

4. A tool of the type described comprising a holder on which may be assembled a multiplicity of split piston rings arranged side by side, a casing adapted to be placed about the piston rings on the holder to exert an inward pressure on the rings, invertible resilient strips set in the inner wall of said casing and providing a multiplicity of spaced apart ring engaging contact points with the piston rings, and means at the ends of said holder adapted for clamping said rings on said holder.

5. In a piston ring clamping device wherein rings are assembled side by side on a holder and adapted to be clamped thereon by endwise pressure at the ends of said holder, and wherein a casing or the like instrumentality is employed for exerting pressure on the rings before clamping the rings on said holder; resilient means carried by said casing to provide a yieldable pressure of said casing on said rings, said resilient means comprising longitudinally disposed spaced apart strips in the wall of said casing, each strip having a configuration to provide a plurality of ring engaging faces brought into active position by changing the position of said strips in said casing.

In testimony whereof I affix my signature.

HARRY S. GRAVES.